Aug. 4, 1959  F. N. GRUBE ET AL  2,897,901
SOD-CUTTING DEVICE
Filed May 15, 1956  2 Sheets-Sheet 1
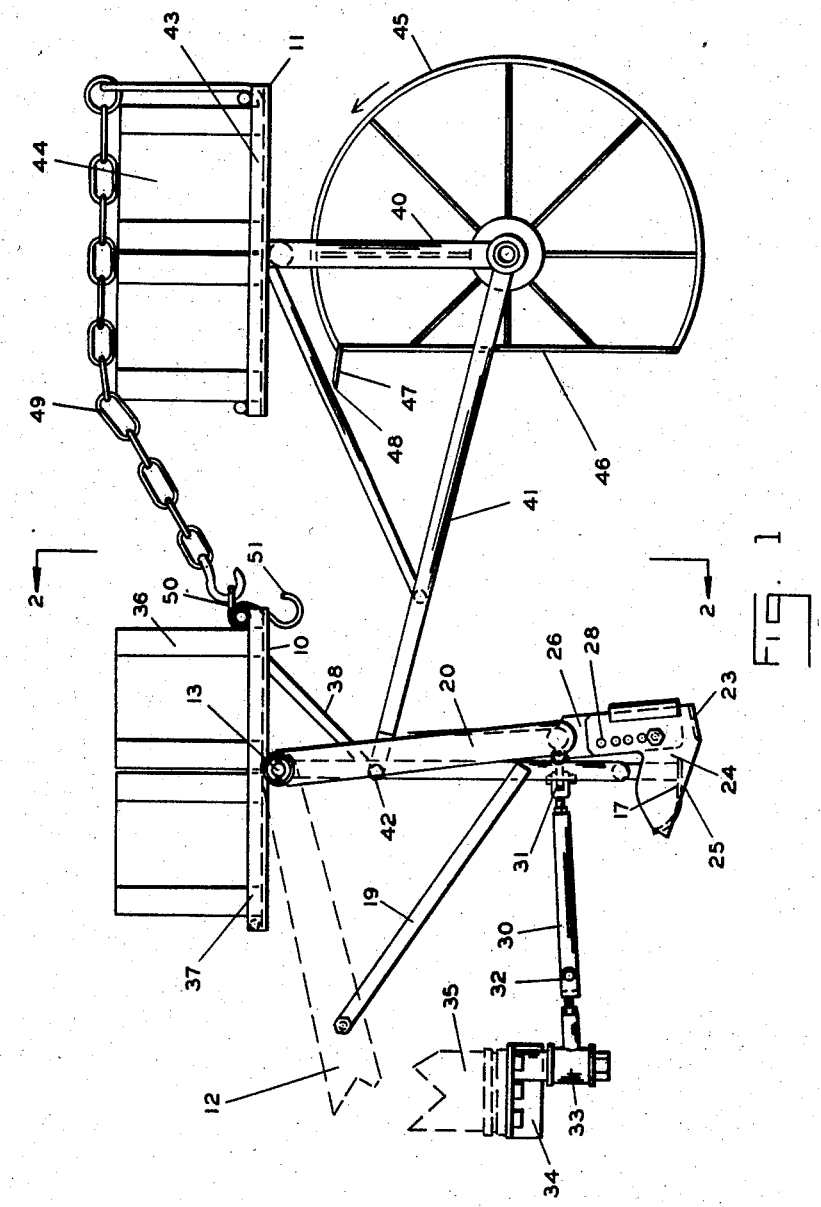
INVENTORS.
FRANK N. GRUBE
KARL W. GREENE, JR.
BY GARY R. GRUBE
ATTORNEYS

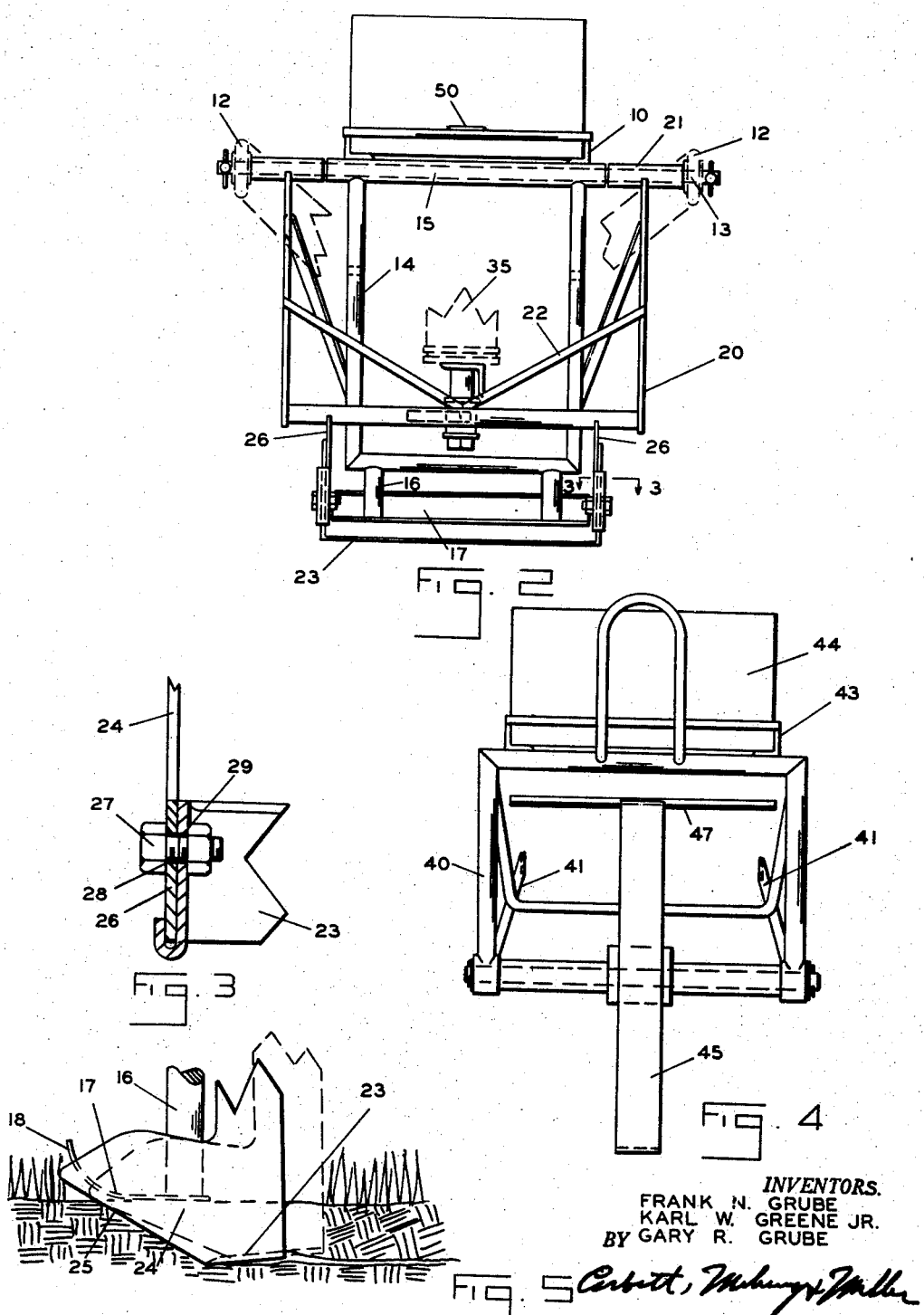

United States Patent Office 2,897,901
Patented Aug. 4, 1959

2,897,901

SOD-CUTTING DEVICE

Frank N. Grube, Karl W. Greene, Jr., and Gary R. Grube, Columbus, Ohio

Application May 15, 1956, Serial No. 585,053

1 Claim. (Cl. 172—20)

Our invention relates to a sod-cutting device. It has to do, more particularly, with a device which is designed as an attachment for a tractor and which will function to cut sod in strips of selected width and also cut the strips into selected lengths as the device passes over the turf.

Many machines have been designed in the past to eliminate the laborious task of cutting and removing sod which was usually done by hand labor. These machines have been so complicated, usually being self-propelled, as to be so costly that most sod is still cut by hand labor. Furthermore, the prior art machines are not only expensive in regard to their initial cost but also in regard to their maintenance, due to their complicated nature and multiplicity of parts subject to wear, jamming, etc. Obviously, the removal of sod from the turf requires a rugged machine or device and prior art machines have not been sufficiently rugged to withstand the forces to which they are necessarily subjected when removing the sod.

It is the main object of our invention to provide a sod-cutting device which can be used as an attachment for standard types of tractors, which is very simple and, therefore, of initial low cost, which includes a minimum number of movable parts subject to wear or damage, and which is of adequately rugged contsruction to withstand the forces to which it is subjected in removing the sod.

Various other objects will be apparent.

The preferred embodiment of our invention is illustrated in the accompanying drawings wherein similar characters of reference designate corresponding parts and wherein:

Figure 1 is a side elevational view of our sod-cutting device illusrtating both the unit for cutting and removing the sod from the turf in the form of strips and the unit for measuring and dividing the strips into proper lengths.

Figure 2 is a rear elevational view of the unit which removes and cuts the sod into strips, the view being taken substantially along the line 2—2 of Figure 1.

Figure 3 is an enlarged detail in section taken substantially along the line 3—3 of Figure 2, and showing the mounting of the end of the cutting blade which cuts and removes the sod from the turf.

Figure 4 is an end view of the strip measuring and severing unit which measures and cuts the strips into proper lengths.

Figure 5 is a diagrammatic view illustrating the action of the skid and associated sod-cutting and removing blade.

With reference to the drawings, in Figure 1 we have illustrated our complete sod-cutting device which comprises the forward sod-cutting and removing unit 10 and the rearward measuring and severing unit 11. Obviously, the unit 11 is disposed in trailing relationship to the unit 10. The unit 10 is designed to be disposed in trailing relationship with a tractor which is not shown in detail but which may be of various standard types. For example, the unit 10 may be readily attached to a "Ford" tractor which is provided with a three-point hitch including a pair of draw bars or arms 12 extending rearwardly therefrom and which form part of a hydraulic lift mechanism. One of these arms 12 is shown in Figure 1 and the ends of both arms 12 are shown in Figure 2.

The unit 10 is suspended from a transverse bearing rod 13 carried on the rear end of the arms 12. The unit 10 includes a U-shape skid frame 14 which has its upper ends attached to a transversely extending sleeve 15 that is mounted on the rod 13. Depending from the lower end of this frame 14 is a pair of rigid skid supports 16 which are rigidly secured at their lower end to a transverse skid 17. This skid 17 is in the form of a flat metal plate which has its forward edge curved upwardly as indicated at 18 in Figure 5. This skid is adapted to rest on the exposed surface of the turf. The skid frame 14 is braced to prevent swinging forwardly and rearwardly by a pair of diagonal braces 19 which are disposed between the bars 12 and the vertical portions of the skid frame 14.

Another U-shape frame 20 is provided for supporting the sod-cutting and removing blade 23 of this unit. Each of the upstanding arms of this frame are connected to a bearing sleeve 21 which is rotatably mounted on the rod 13, each sleeve 21 being disposed outside the adjacent end of the sleeve 15 on the rod 13, so that the sides of the wider blade supporting frame 20 are disposed outside beyond the sides of the skid frame 14. The frame 20 is braced transversely by means of the braces 22 which extend diagonally at the lower corners of the frame between the side members and the lower transverse members thereof. Attached to the lower end of the frame 20 for vertical adjustment relative thereto is the sod-removing and cutting blade 23. This blade has a body which extends transversely and is of proper length to cut the sod to the desired width. Its forward edge is a sharp knife edge and at each end an edge cutting knife portion 24 is provided. As shown best in Figures 1 and 5, each knife portion 24 is provided with a sharp lower edge 25 which inclines upwardly and forwardly. Each knife portion 24 is of sufficient vertical extent to extend above the sod. Thus, the blade 23 is substantially U-shape and its ends are adjustably connected to depending blade supports 26 which extend downwardly from the lower member of the frame 20 and are rigidly attached thereto. The blade 23 is attached to the arms 26 by means of clamping bolts 27, shown in Figure 3, which pass through openings 28 in the blade portions 24 and selected vertically spaced openings 29 in the arms 26, to permit positioning the blade at selected levels on the frame 20. The blade 23 is tilted slightly forwardly and downwardly so that the blade will tend to dig into rather than come out of the turf.

The frame 20, which carries the sod-cutting and removing blade 23, is adapted to be oscillated about the axis of the rod 13 relative to the skid member 17. This oscillation is accomplished by providing a pitman rod 30 which is connected at its rear end by means of a clevis connection 31, which permits horizontal swinging movement, to the lower member of the frame 20 midway between the sides of the frame. The forward end of this pitman rod 30 is connected by means of a clevis 32, which permits vertical swinging movement, to a crank pin 33 of an eccentric member 34. The member 34 is attached to the rotatable power take-off 35 of the tractor.

The vertical distance between the lower surface of the skid 17 and the forwardly directed cutting edge of the blade 23 will determine the thickness of the sod which is cut and removed from the turf by the unit 10. This distance can be adjusted by removing the clamping bolts 27 at the ends of the blade 23 and repositioning them in openings 29 at a different level. The arms 12 of the hydraulic lift will be allowed to seek their own level as the tractor moves along so that during the initial movement over the turf the edging blades 25 will cut into the turf and the forward edge of the blade 23 will dig into the turf until the skid 17 rides on the surface thereof. Thereafter, the skid 17 will ride on the surface and the blade 23 will be oscillating forwardly and rearwardly about the axis of the rod 13 at a predetermined level below the surface, cutting the sod at such level to produce sod of proper thickness, as indicated in Figure 5. Also, the edging blades 25 will sever the sod at the edges to form a strip of proper width. The cutting action of the forward edge of the blade 23 and the edges 25 of the edging blade portions 24 will be greatly facilitated by the backward and forward oscillations of the blade. Weights 36 may be provided on a rack 37, attached to the sleeve 15 and braced by diagonal braces 38 attached to the rack and skid frame 14, to provide sufficient weight to hold the blade 23 in the turf.

The unit 10, as described above, will cut the sod into strips of proper width and sever it from the turf at its lower side. It is also desirable to cut the strips into proper lengths so that they can be rolled and handled. For this purpose the unit 11, as previously suggested, is provided to measure and sever the strips into proper lengths as it trails behind the unit 10.

This unit 11 comprises a frame 40 which is provided with a pair of forwardly extending draft tongues 41 which are pivotally attached at 42 to the vertical portions of the skid frame 14 of the unit 10. The frame 40 includes a supporting rack 43 rigidly carried at its upper side for supporting weights 44. The frame rotatably carries a measuring flat wheel 45. At one end of the flat side 46 of this wheel 45 a transversely extending strip severing blade 47 is provided. This blade is disposed substantially normal to the flat side 46 and its outer edge is a knife edge 48. The blade 47 is of the same length as the blade 23 of the unit 10.

As the unit 11 is pulled along by the unit 10, the curved portion of the wheel 45 will roll along and will, in effect, measure the length to be removed from the sod strip previously cut by the unit 10. As the lower end of the flat surface 46 rolls into contact with the surface of the turf, the blade 47 will drop with a heavy impact and will cut into the sod strip and sever a predetermined length from the remainder of the strip.

Thus, it will be apparent that as my device is pulled along by a tractor, the unit 10 will cut the sod into strips of proper width which are completely detached from the turf except at the forward end of the strip which will still remain attached to the turf. However, the trailing unit 11 will measure predetermined lengths of the strip and sever such lengths from the strip as it is pulled along over the strip.

By operating the hydraulic lift of which the arms 12 form a part, the unit 10 can be lifted sufficiently from the turf when it is desired to turn the tractor for a reverse pass over the turf or to move the tractor and attachment to a new location to start a new strip. When the unit 10 is raised slightly in this manner, the pitman 30 will pivot for vertical swinging at the clevis 32. When the unit 10 is raised slightly in this manner, the unit 11 will also be raised therewith. This unit 11 would merely pivot about the pivots 42 and would not be raised, if it were not for the provision of the chain 49, which is connected to the rack 43 of the unit 11 above the weights 44 and is hooked to the rear end of the rack 37 of the unit 10 as indicated at 50 in Figure 1. This chain and hook arrangement will prevent the frame 40 from swinging downwardly about the pivots 42 as the unit 10 is raised. For transportation for greater distances, the connection of the pitman 30 to the frame 20 at the clevis 31 may be broken and the unit 10 may be swung upwardly with the arms 12 to a higher level. If it is desired not to use the unit 11 for short periods, it may be swung upwardly relative to the rack 37 of the unit 10 and attached thereto by means of a double hook 51 which will engage the rack and the frame 40.

It will be apparent from the above description that we have provided a very simple sod-cutting device which can be used as an attachment for a tractor and which will function very effectively in removing the sod in strips of proper width and in cutting the strips into proper lengths. The device is of inexpensive but rugged construction and can be maintained easily and at low cost.

Having thus described our invention, what we claim is:

A sod cutter comprising supporting and transporting means for operating along the surface of the turf and a horizontally disposed main cutting blade extending in a flat plane transversely of the cutter with its cutting edge directed forwardly and at a lower level than the level where the turf surface is engaged by said supporting and transporting means so as to cut sod of a predetermined thickness as the cutter is moved along the turf, means for moving the cutting blade back and forth relative to the direction of movement of the cutter as the cutter is moved along to facilitate the cutting action, said cutting blade being provided with vertically disposed cutting knife portions at each side extending forwardly of the main blade with their cutting edges formed along the lower edges thereof and inclined forwardly and upwardly relative to the forward cutting edge and the flat plane of the main blade for cutting the sod from the turf at the edges of the sod as the cutter advances, means for measuring and severing predetermined lengths of the sod which has been previously cut by said blade, said means comprising a flat wheel connected by means pulling it along with the cutter at a position behind the cutting blade, said flat wheel being provided with a chordal flat section and a transversely extending severing blade at one end of the flat section of the wheel.

References Cited in the file of this patent

UNITED STATES PATENTS

| | | |
|---|---|---|
| 18,351 | Newman | Oct. 6, 1857 |
| 549,730 | Lane | Nov. 12, 1895 |
| 776,844 | Hudlemeyer et al. | Dec. 6, 1904 |
| 1,143,785 | Ruth | June 22, 1915 |
| 1,398,500 | Carkey | Nov. 29, 1921 |
| 1,503,794 | Kruse et al. | Aug. 5, 1924 |
| 2,314,215 | Hilblom | Mar. 16, 1943 |
| 2,345,425 | Phillips | Mar. 28, 1944 |
| 2,534,838 | Wall | Dec. 19, 1950 |
| 2,646,740 | Luoma | July 28, 1953 |

FOREIGN PATENTS

| | | |
|---|---|---|
| 842,200 | France | Feb. 27, 1939 |
| 256,264 | Germany | Feb. 6, 1913 |